May 2, 1933. J. A. ALTMAN 1,906,506
NUT CRACKER
Filed Sept. 30, 1930
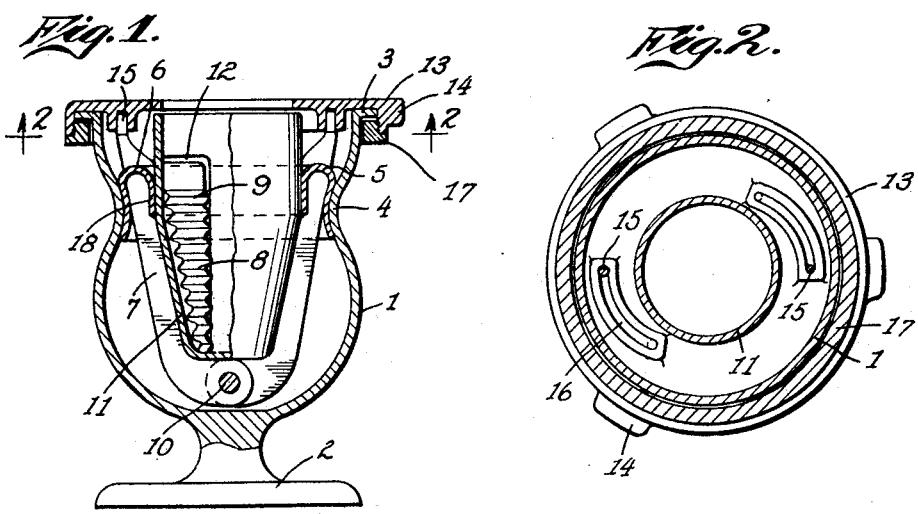
Inventor
Jacob A. Altman;
By Lyou Thyou
Attorneys Patented May 2, 1933

1,906,506

UNITED STATES PATENT OFFICE

JACOB A. ALTMAN, OF LOS ANGELES, CALIFORNIA

NUT CRACKER

Application filed September 30, 1930. Serial No. 485,357.

This invention relates to the construction of devices capable of being used for cracking nuts. The general object of the invention is to provide simple means whereby manual force can be advantageously applied to force two jaws relatively toward each other.

As usually constructed, nut crackers are not provided with means for holding the parts of the cracked nut and the cracked parts of the nut must usually be caught in the palm of one's hand when the nut cracker is used. One of the objects of this invention is to provide a simple means for holding the parts of the cracked nut and to provide a construction devoid of projecting levers or handles which will at the same time enable sufficient force to be exerted to effect the cracking of the nut.

One of the objects of the invention is to produce a nut cracking device of simple construction which is of compact form and which will be of symmetrical and attractive appearance so that it can be employed as a cracking cup for nuts at one's table; also to construct the nut cracking cup in such a way as to facilitate the removal of the cracked nut.

Further objects of the invention will appear hereinafter.

The invention consists in the novel parts and combinations of parts to be described hereinafter, all of which contribute to produce an efficient squeezer apparatus.

A preferred embodiment of the invention is described in the following specification, while the broad scope of the invention is pointed out in the appended claims.

In the drawing:

Figure 1 is a vertical section through an embodiment of the invention in a device for squeezing nuts to crack the same, certain parts being broken away.

Figure 2 is a horizontal section taken on the line 2—2 of Figure 1 and further illustrating this embodiment of the invention.

Before proceeding to a detailed description of the invention, it should be stated that according to my invention I provide relatively movable jaws which are capable of being moved relatively toward each other by the manual rotation of an actuating part or handle. In embodying this invention in a nut cracking device the two jaws are preferably mounted in a cup that receives the nut, the upper end of the cup being provided with a rotary cap which connects the upper ends of the jaws by any suitable means to enable the rotation of the cap to cause the jaws to approach each other.

In the embodiment of the invention illustrated in Figures 1 and 2, the device includes a cup 1 which is adapted to rest upon a table in an upright position. This cup is preferably constructed of metal and may be provided with an integral base 2. Near its upper end or lip 3 the cup is preferably provided with a constricted throat 4 in which I mount a centering ring 5 having a pair of radial notches 6 oppositely disposed to receive the levers 7 of two jaws such as the jaw 8. These two jaws are of concave form and present wickers or teeth 9 on their adjacent faces. These jaws converge toward the bottom of the cup, at which point the levers 7 are connected together by a pivot 10. I prefer to provide the cup 1 with an inner cup 11 that receives the nut to be cracked, and this inner cup has oppositely disposed openings 12 through which the jaws 8 project. On the lip 3 of the cup I provide a rotary member such as the cap 13 which may be provided with a handle or a plurality of lugs 14 to facilitate its rotation.

Between the levers 7 and the cap I provide a connection for translating the rotary motion of the cap into a pivotal movement of the lever 7. This is preferably accomplished by providing the upper end of each lever 7 with a small handle or pintle 15 which is received in an eccentric slot 16 formed in the under side of the cap.

If desired, the cap 13 may be locked in the lip of the cup by means of a collar 17 that is threaded into the lower side of the cap (see Figure 1). The collar 5 is formed of a roll of metal and presents an integral downwardly projecting sleeve or flange 18 that receives the upper end of the inner cup 11. This portion of the cup is cylindrical but the lower portion is preferably conical.

It is understood that the embodiment of the invention described herein is only one of the many embodiments this invention may take, and I do not wish to be limited in the practice of the invention, nor in the claims, to the particular embodiment set forth.

What I claim is:

1. In a device of the kind described for use as a nut cracker, the combination of a cup, opposing jaws pivotally mounted toward the bottom of the cup, and a rotatable member mounted on the upper end of the cup and having means for engaging the jaws for moving the same toward each other to crack the nut.

2. In a device of the kind described to be used as a nut cracker, the combination of a cup, a pair of oppositely disposed jaws pivotally mounted adjacent the bottom of the cup and capable of assuming a position of rest in which they diverge in an upward direction, said jaws having actuating handles on their upper ends, and a cap rotatably mounted on the upper part of the cup and having cam means for engaging the handles of said jaws to force the jaws together when the cap is rotated.

3. In a device of the kind described to be used for cracking nuts, the combination of a cup, a pair of opposed movable jaws mounted in the cup, an inner cup having openings in the wall thereof through which the said jaws operate, and a rotatable member on the upper end of the cup having means engaging the upper ends of the said jaws for actuating the same to cause the jaws to approach each other.

4. In a device of the kind described to be used for cracking nuts, the combination of a cup, a pair of opposed movable jaws mounted in the cup, an inner cup having openings in the wall thereof through which the said jaws operate, and a rotatable member on the upper end of the cup having means engaging the upper ends of the said jaws for actuating the same to cause the jaws to approach each other, and a centering ring for the inner cup seating within the first-named cup.

Signed at Los Angeles, California this 9th day of July, 1930.

JACOB A. ALTMAN.